(12) United States Patent
Giorgini et al.

(10) Patent No.: US 11,448,596 B2
(45) Date of Patent: Sep. 20, 2022

(54) METHOD TO MEASURE THE REFRACTIVE INDEX OF A SAMPLE USING SURFACE PLASMON POLARITONS

(71) Applicant: CONSIGLIO NAZIONALE DELLE RICERCHE—CNR, Rome (IT)

(72) Inventors: Antonio Giorgini, Naples (IT); Saverio Avino, Nola (IT); Pietro Malara, Pozzuoli (IT); Gianluca Gagliardi, Naples (IT); Paolo De Natale, Prato (IT)

(73) Assignee: CONSIGLIO NAZIONALE DELLE RICERCHE—CNR, Rome (IT)

( * ) Notice: Subject to any disclaimer, the term of this patent is extended or adjusted under 35 U.S.C. 154(b) by 215 days.

(21) Appl. No.: 16/764,518

(22) PCT Filed: Nov. 16, 2018

(86) PCT No.: PCT/EP2018/081635
§ 371 (c)(1),
(2) Date: May 15, 2020

(87) PCT Pub. No.: WO2019/097024
PCT Pub. Date: May 23, 2019

(65) Prior Publication Data
US 2020/0371025 A1 Nov. 26, 2020

(30) Foreign Application Priority Data
Nov. 16, 2017 (IT) .................. 102017000130946

(51) Int. Cl.
*G01N 21/21* (2006.01)
*G01N 21/552* (2014.01)
(Continued)

(52) U.S. Cl.
CPC .......... *G01N 21/553* (2013.01); *G01N 21/21* (2013.01); *G01N 21/4133* (2013.01); *G01N 21/77* (2013.01); *G01N 2021/7789* (2013.01)

(58) Field of Classification Search
CPC ..... G01N 2021/0346; G01N 2021/432; G01N 2021/7789; G01N 21/05; G01N 21/23;
(Continued)

(56) References Cited

U.S. PATENT DOCUMENTS 5,255,075 A * 10/1993 Cush .................... G01N 21/552
356/519
2006/0227331 A1 10/2006 Vollmer et al.
(Continued)

*Primary Examiner* — Hoa Q Pham
(74) *Attorney, Agent, or Firm* — Volpe Koenig

(57) ABSTRACT

A method to measure the refractive index of a sample, includes: providing a plasmonic sensor including a sensing surface in contact with the sample; providing an optical resonator, the plasmonic sensor being integrated therein as a reflecting surface; providing a first input field of electromagnetic radiation as a primary carrier; providing a second input field of electromagnetic radiation as a secondary carrier having a second frequency different from the first and defined as: second frequency=first frequency+$\Delta v$ and having a TE and/or a TM polarized component; impinging simultaneously with the first and second input field the plasmonic sensor; tuning the frequency of the first field and/or the value of $\Delta v$; detecting a resonator output power corresponding to the first and second intra-cavity fields resonating; determining a difference between the first and the second resonating frequencies; and calculating the refractive index of the sample from the difference.

11 Claims, 10 Drawing Sheets

(51) Int. Cl.
*G01N 21/41* (2006.01)
*G01N 21/77* (2006.01)

(58) Field of Classification Search
CPC ...... G01N 21/39; G01N 21/45; G01N 21/553;
G01N 21/7746; G01N 21/4133; G01N
21/21; G01N 21/77; G02B 2006/1213
USPC .................................. 356/445–448, 128–137
See application file for complete search history.

(56) References Cited

U.S. PATENT DOCUMENTS

2007/0159633 A1* 7/2007 Yin ...................... G01N 21/553
356/445
2013/0120752 A1 5/2013 Lee et al.

* cited by examiner

METHOD TO MEASURE THE REFRACTIVE INDEX OF A SAMPLE USING SURFACE PLASMON POLARITONS

The present invention refers to a method to measure the refractive index of a sample using surface plasmon polaritons.

Surface Plasmon Polaritons (SPP) or Surface Plasmons are electromagnetic waves that can propagate along the interface between two media, such as at the interface between a metal and a dielectric material. They correspond to oscillations of electrons at the interface between the materials, such as those of electrons excited by photons (by transfer of energy and momentum). Surface Plasmon Resonance (SPR) can be coupled approaching with different optical configurations. A common one is the Kretschmann configuration, where SPR resonance is coupled at interface between a dielectric and a metal layer deposited on a surface of an optical prism. For practical application an SPR chip is considered as an exchangeable sensing element. This includes a lab slide with a metal deposition on one side and can be connected, by the opposite side, to the surface of the prism. The SPR condition can be thus realized thanks to the electromagnetic radiation propagating through the prism to metal layer, under given condition of wavelength, incidence angle of the electromagnetic radiation on the metal layer and electric field polarization. The prism function is to guarantee the phase-matching condition between the photons and electromagnetic wave propagating along the surface and leading the charge oscillations (i.e. plasma waves) given the different propagation constants in the prims medium and in the dielectric respectively. In this configuration the SPR coupling can be observed by measuring the reflected power of p-polarized light of a given wavelength at a metal-dielectric interface for a varying angle of incidence. Alternatively, surface plasmon resonance can be observed by measuring the reflected power of p-polarized light for a given angle of incidence, at a metal-dielectric interface, and varying the wavelength of the p-polarized light.

The coupling condition of Surface Plasmon Resonance may be very sensitive to changes of dielectric parameters of the medium surmounting the metal layer at surface. The principle of surface-plasmon-resonance-based chemical sensing involves providing a thin layer of chemically active material, which may be called a sensing layer, on the metal surface at which the surface plasmons are excited. The excitation of the surface plasmon resonance is directly related to the interface properties. Changes in the sensing layer brought about by the presence of an analyte result in changes in the phase matching condition and thus in the excitation angle or in the peak resonant wavelength of the surface plasmon resonance. By monitoring the excitation angle or the resonant wavelength, the chemical bond activity at the interface can be observed and an analyte concentration may be determined.

The working principle of a surface-plasmon-resonance-based sensor can, for example, be based on the incident angle dependence of the surface plasmon resonance. Such an approach may require a prism coupler and requires rotatable equipment. Further, such sensors may suffer from the influence of vibrations due to the use of discrete components such as micro-objective lenses, lasers and photodetectors.

Another approach is wavelength spectroscopy surface plasmon resonance, in which a resonant wavelength shift of surface plasmon resonance is monitored. In this approach the size of the sensor can be smaller and more compact. However, it requires a multi-wavelength source and a spectrometer. The performances are limited by the amplitude noise of electromagnetic source; deep noise filtering processes and the implementation of offline averaging routine are required.

Surface plasmon resonance has been involved in different sensor applications such as, for example, for label-free sensing in biochemistry. However, commercially available surface plasmon resonance sensors are large in size and costly. In particular, the spectroscopic based devices are compact but guarantee limited performances. On the other side interferometry based setups presents high level performances, thanks to a differential readout regime, but required costly, delicate and large setups.

Further, despite all efforts, the performance of these sensors is still insufficient to detect low-molecular weight analytes, e.g. proteins and hormones, or larger molecules at very low concentration. To address their intrinsic limitations, numerous strategies have been proposed that amplify the sensor response to the binding of target molecules. Moreover, various novel plasmonic platforms have been developed to enhance sensitivity, such as those based on localized surface plasmons with metallic nanoparticles and hyperbolic metamaterials.

It has been seen that the performance of different SPR set-ups is basically independent of the used excitation platform and interrogation method, the limiting factor being mainly attributed to intrinsic instabilities of the radiation source (intensity noise) and other noise in the opto-electronic system. Despite that, the readout of SPR commercial devices still are based on the well-established schemes, founded on the measurement of changes in the characteristics of light coupled to surface plasmons, including coupling angle or wavelength or intensity.

In addition, interferometric implementations based on differential readout regime have been realized or proposed. These devices are based on measurements of interference between an interacting field and a not-interacting one. These fields are named as probe filed and reference field respectively. Performances are limited by the propagation of the two fields along different paths (arms of the interferometer), this complicates the device engineering, opening many finding in terms of acoustical noise pick up, and limits any common mode noise suppression. For interferometer based setups the sensitivity increases with the path length increase, which means that it scales directly with the size of the devices.

In the present invention, an interacting field with the SPP and a not-interacting one are considered. A common path propagation is included in order to provide common mode noise suppression from the environmental driven vibrations pickup. This simplifies the engineering and facilitates a more compact interferometric devising. Frequency domain readout regime is provided.

US 2006/227331 describes a method and apparatus for performing refractive index, birefringence and optical activity measurements of a material such as a solid, liquid, gas or thin film. The method and apparatus can also be used to measure the properties of a reflecting surface. The disclosed apparatus has an optical ring-resonator in the form of a fiber-loop resonator, or a race-track resonator, or any waveguide-ring or other structure with a closed optical path that constitutes a cavity. A sample is introduced into the optical path of the resonator such that the light in the resonator is transmitted through the sample and relative and/or absolute shifts of the resonance frequencies or changes of the characteristics of the transmission spectrum are observed. A change in the transfer characteristics of the resonant ring, such as a shift of the resonance frequency, is related to a sample's refractive index (refractive indices) and/or change thereof. In the case of birefringence measurements, rings that have modes with two (quasi)-orthogonal (linear or circular) polarization states are used to observe the relative shifts of the resonance frequencies. A reflecting surface may be introduced in a ring resonator. The reflecting surface can be raster-scanned for the purpose of height-profiling surface features. A surface plasmon resonance may be excited and phase changes of resonant light due to binding of analytes to the reflecting surface can be determined in the frequency domain.

In an aspect, the invention relates to a method to measure the refractive index of a sample, the method including:
  providing a plasmonic sensor capable to allow, upon illumination with electromagnetic radiation, a surface plasmon resonance condition, the plasmonic sensor including a sensing surface in contact with the sample to be measured;
  providing an optical resonator having a output channel, the plasmonic sensor being integrated in the optical resonator as a reflecting surface of the same;
  providing a first input field of electromagnetic radiation as a primary carrier having a first frequency and having a TE and/or a TM polarized component with respect to the sensing surface;
  providing a second input field of electromagnetic radiation as a secondary carrier having a second frequency different from the first frequency and defined as follow:

second frequency=first frequency+$\Delta \nu$ and having a TE and/or a TM polarized component with respect to the sensing surface, the first and second input field being part of the same beam and travelling along the same optical path;
  impinging simultaneously with the first and second input field (4, 4') the plasmonic sensor (3) integrated in the optical resonator (10) so as to excite two orthogonal modes of the optical resonator to produce a first and second intra-cavity field in the optical resonator corresponding to the TE or TM component of the first input field (4) and to the TM or TE component of the second input field (4');
  varying the frequency of the first input field and/or the value of $\Delta \nu$ till the value of the first frequency and the value of the second frequency are such that the frequency of the first field corresponds to the frequency of a TE or TM intra cavity mode and the frequency of the second input field corresponds to the frequency of a TM or TE intra cavity mode, obtaining a first resonating frequency and a second resonating frequency;
  detecting a resonator output power corresponding to the first and second intra-cavity fields resonating in the optical resonator;
  determining a difference between the first resonating frequency ($v_1$) and the second resonating frequency ($v_2$); and
  calculating the refractive index of the sample from the difference between the first and second frequency.

A Surface Plasmon Resonance Based sensor—called in the following plasmonic sensor—is known in the art and it is a sensor defining a first and a second surface, on one of which a sample is placed. The method of the invention is intended for detecting a refractive index of a liquid or gas including an object to be detected (a liquid or gas including an object to be detected is hereinafter referred to as "sample"), and the surface plasmon sensor is used in detection of concentration of a solution, detection of proteins and macromolecules, etc. Further, according to the method of the invention, an adsorption procedure of an object to be detected to an adsorption layer of a metal layer that adsorbs the object, temporal change of an adsorption reaction, etc., can also be detected by surveying temporal change of a refractive index of a liquid or gas including the object.

The Plasmonic sensor may include a Surface Plasmon Resonance chip as an interchangeable element on witch a metal nanodeposition/nanofabrication has been imprinted for plasma oscillation coupling, and to be integrated in the coupling/readout optical system.

The surface plasmonic sensor used in the method of the invention may be standard, for example, as known in the art, and it may include: a metal layer on a dielectric substrate such as quartz and glass. Additional chemical functionalization can be implemented on the active surface in order to realize selective platforms for the detection of a specific target (selective detection) i.e. predetermined molecules. By casing a liquid including the molecules to contact the adsorption layer, the surface plasmonic sensor causes the molecules to be captured by the functionalized surface.

The metal used in the metal layer has preferably conduction band electrons capable of resonating with the incoming light at a suitable wavelength in coupling condition. Metals that satisfy this condition are silver, gold, copper, aluminum, sodium and indium. In addition, the metal on the sensor surface are preferably free of oxides, sulphides and it must not react with other molecules on exposure to the atmosphere or liquid. Of the metals, gold is the preferred one.

Gold is very resistant to oxidation and other atmospheric contaminants but is compatible with many chemical modification systems. The thickness of the metal layer is of great importance.

Then, the surface plasmonic sensor detects a refractive index of the solution by radiating light field from a light source to the surface of the metal layer which surface is opposite to the surface where the adsorption layer is provided.

The surface plasmonic sensor uses surface plasmon resonance in order to detect the refractive index. The surface plasmon resonance is a phenomenon that in a case where light field is incident to a metal layer on a dielectric substrate with an appropriate polarization direction and an appropriate incident angle, when the wavenumber of the light field that is orthogonal to the metal layer is identical with the wavenumber of the electromagnetic wave propagating along the interface surface, a resonance is generated. The surface plasmon is a dilatational wave in which free electrons on a metal surface vibrate in a direction parallel to the metal surface.

The surface plasmon resonance produces an evanescent wave extending away from the surface of the resonance film over a sensing range; and therefore the sample placed in contact with the plasmonic sensor can be investigated in a volume having a thickness that is substantially within the sensing range.

In the surface plasmonic sensor, when the light field is radiated to the metal layer so that the light field is incident to the metal layer with an appropriate incident angle and an appropriate polarization and through a medium with appropriate dielectric parameters, the light field is converted into surface plasmons on the metal layer. Consequently, the reflectance of the metal layer to the light field is reduced since a part of energy is used in conversion to the surface plasmons.

That is, the appropriate incident angle is the incident angle θ at which most of the light field is converted into the surface plasmons on the metal layer. The appropriate polarization direction is a polarization direction that is parallel to an incident plane including a normal line of an interface between the dielectric substrate and the metal layer and an optical axis of the light field (p-polarization, also called TM). When the light field is in a polarization direction perpendicular to the incident plane (s-polarization, also called TE), the surface plasmon resonance is not generated.

Therefore, if an electromagnetic radiation including both TM and TE polarization components impinges on the surface plasmonic sensor, only the TM component is capable of exciting a surface plasmon wave.

The electromagnetic radiation is preferably emitted by a laser source.

According to the invention, the electromagnetic radiation at a given frequency and wavelength impinges on the plasmonic sensor. The surface on which it impinges is opposite to the surface in contact to the sample. The angle of incidence is preferably as such that a plasmonic resonance takes place for the given polarization chosen for the electromagnetic radiation. The TE component of the impinging electromagnetic radiation is substantially reflected unchanged by the surface, while the TM component may couple with the plasmonic wave and may experience a different optical path-length (n L, where n is refractive index and L is the geometrical length) because of its interaction. Thus, reflected from the surface of the plasmonic sensor there is the TE component which is substantially unchanged, while the TM component is partially absorbed and phase delayed.

An optical resonator is a spectrally selective element. Giving the optical resonator path-length L and an intra-cavity refractive index n, only a given set of discrete frequencies can resonate as intra-cavity field. Given the integration of the plasmonic sensor as a reflecting surface, for example as an intermediate mirror of the optical resonator, two cavity mode systems not-degenerated in frequency can be considered, respectively for the two polarizations TE and TM of the input field. As a consequence of the different optical path-length experienced by the TE and by the TM components of the input fields during the intra-cavity propagation, that is, during the propagation within the optical resonator, the two modal systems result to be frequency shifted one with respect to the other. This can be interpreted as due to a different intra-cavity effective refractive index experienced by the two fields at the SPR interaction point. The frequency shift, i.e. the frequency degeneracy removal between the two modal systems, depends on the interaction strength of the TM mode with the sensing element, i.e. on the SPR coupling amount.

The optical resonator is preferably a resonant optical cavity. For example, it is preferably a V-shaped resonant optical cavity. Preferably, the optical cavity includes at least three mirrors. Even more preferably, the plasmonic sensor is an intermediate mirror of the optical cavity.

The optical resonator can be also an optical ring resonator (travelling wave configuration), where a waveguide or a fiber forms a loop which defines the resonator. In this case the plasmonic sensor is preferably integrated into the fiber. For example, the fiber may be properly machined or otherwise worked so that a surface having a given incidence angle is obtained. On this surface formed in the cladding, a metal layer is thus deposited, forming part of the plasmonic sensor. The geometrical parameters can be calibrated considering the dielectric parameters of the fiber core and fiber cladding The optical resonator may include a so called travelling wave resonator in a bulk or integrated setup. The plasmonic sensor may be integrated within the travelling wave resonator propagation path. The realized resonator preferably preserves the polarization orientation of the inputs fields during the propagation.

An electro-magnetic field which is propagating in the optical resonator is called "intra-cavity" field.

Further, the optical resonator includes an output channel, or more than one output channel, in order to detect the intra-cavity fields parameters from the resonator outcoupling.

From a practical point of view, it can be considered that there is a given frequency of the input electromagnetic field for which the TE component resonates in the optical cavity.

There is also a different frequency of the input electromagnetic field for which the TM component of the input field resonates in the optical cavity. The frequency is different due to the TM field interaction with the plasmonic sensor.

According to the invention, preferably from a single source, two fields are generated which impinge against the sample. Therefore, there are two fields which at the same time impinge on the plasmonic sensor.

The two fields however, although preferably generated by the same source, can have different wavelength (i.e. frequency). For example, the second field can be considered to be a "sideband" of the first field. The important aspect is that the first and the second field form a single beam and travel the same optical path. Optical path stands for geometrical path and refers to the path travelled by the electromagnetic waves (the first and second field).

The 2 fields contained within the same optical beam are both polarized with a non-zero component along TE and along TM polarization states. Preferably, they are linearly polarized but they can also be circularly or elliptically polarized so that both have always a non-zero component along th TE and along the TM polarization states.

The frequency of the first field can be linked to the frequency of the second field in this way. Calling $v_1$ the frequency of the first component, the frequency of the second component can be defined as:

$$v_2 = v_1 + \Delta v$$

Where $\Delta v$ is a "frequency shift" between the first and the second frequency. In other words, the $\Delta v$ represents the difference in frequency between the first and the second input field.

Changing the value of $\Delta v$ and changing the value of $v_1$ allows to find a condition, that is a value of $\Delta v$ and $v_1$, for which a "double simultaneous resonance" condition takes place.

In other words, in this invention the condition in which there is the first field having its TE (or TM) component resonant in the optical resonator and the second field having its TM (or TE) component resonant in the optical resonator is created. The frequency at which the first and the second input field become resonant in the cavity is different, due to the fact that only the TM component is coupled with the plasmonic wave. In the resonant cavity there are therefore at least two modes resonating (at the same time), the one excited by the TE component of the first input field at frequency $v_1$ and the other one excited by the TM component of the second input field at frequency $v_2$ (or the opposite, that is the first field might have a TM component and the second field a TE component which are resonant). Therefore, simultaneously, the TM (or TE) component having a first frequency is resonant and the TE (or TM) component having a second frequency (different from the first frequency) is resonant in the cavity. The permanence of such simultaneous resonating condition is guaranteed in this invention preferably by two feedback channels acting separately on the first field and on the second field.

This is possible due to a proper variation of $\Delta v$ and $v_1$ till this double resonance is achieved.

In a preferred embodiment, the first and second field can be generated starting from the same laser source.

The interrogation of the SPR element by TE and a TM-polarized fields at different optical frequencies, simultaneously resonating in the optical cavity, and originated by the same radiation source, leads to a perfect cancellation of the noises, independent from the considered timescale. The mechanical noise reduction is ensured by the common-path propagation of the TE and TM fields. In addition, if compared to the 'laser scan' for example used in the prior arty to detect the frequency of resonance, simultaneous TE-TM interrogation allows for a real-time readout of the SPR, not limited by the v-time gap. Uniquely, this scheme also provides a final radio-frequency signal, generated by the beat between TE and TM fields at the resonator output, which is directly related to the SPR coupling, i.e. to the refractive index, as detailed below.

This can for example be obtained as follows. The first input field at the first given frequency is provided by the laser source carrier itself (primary carrier), the second field at the second different frequency generated by the same source can be obtained by phase modulation of the first field—the primary carrier, in order to generate a secondary carrier. The amplitude of the phase modulation can be calibrated in order to have a contemporary existence of a primary carrier and a secondary carrier with balanced amplitudes.

The first and second frequencies (or wavelengths) of the first and the second input fields for which the TE component of the first input field is resonant in the optical resonator and at which the TM component of the second input field is resonant in the optical resonator are not known a priory. This is the reason why a real-time control of parameters of the first and of the second field is needed.

In order to maintain the first and second field at the desired frequencies two independent feedback channels may be used, acting respectively on the laser emission frequency and on a local oscillator frequency, used for the secondary field generation (i.e. the "sideband").

Feedback channel acting on the resonator length, so that to stabilize the frequency of a mode of the resonator to a frequency reference carrier can be also alternatively considered.

The two feedback channels may guarantee the simultaneous resonant condition, for a TE field and a TM field at different frequencies, in the optical resonator, i.e. the simultaneous excitation of two resonator modes associated to two different polarization states.

The difference in frequency between these two resonating modes provides information on the strength of the coupling of the TM-polarized mode with the plasmonic wave and thus gives a measure of the refractive index of the sample.

Therefore, the output of the resonator is detected and the difference between the two frequencies is retrieved from the oscillation frequency of the resulting beat-note signal, that is the difference between the frequency at which a TE intra-cavity field is resonant in the optical resonator and the frequency at which a TM intra-cavity field is resonant in the optical resonator simultaneously.

The gift of the invention is therefore the simultaneous interrogation with TE and TM fields co-propagating within the same optical beam and optical path at different frequencies. As a result, the sample refractive index is measured directly by a frequency (radio-frequency) measurement, free from any other amplitude or phase noise affecting the laser and the optical set-up. As an example, in a preferred embodiment, the interrogation can be described as:

1. integrating the SPR unit in a resonator,
2. tuning the incidence angle of a surface of the plasmonic sensor in order to couple the Plasmon Resonance with a single wavelength radiation source at wavelength $\lambda$,
3. impinging a single wavelength laser onto the resonator with linear polarization rotated of 45° in order to obtain a TE and TM fields superposition,
   3b) alternatively a superposition of a TE and TM input field can be obtained using a circular polarized laser output
4. applying a phase modulation at frequency $v_{modulation}$ to the input field (having a frequency equal to $v_{laser}$) in order to generate a Secondary Carrier at frequency $$v_{Secondary} = v_{laser} + v_{modulation}$$

5. obtaining the phase modulation above described either:
   a. using an external Electro-Optic Modulator at the output of the laser,
   b. directly modulating the laser current (acting on a bias tee).
6. Providing the current/voltage signal with frequency $v_{modulation}$ by a variable frequency Local Oscillator (such as LO1 in the figures)
7. in order to modify the frequency $v_{Secondary}$ of the second field, the frequency $v_{modulation}$ is preferably tuned by acting on the Local Oscillator controls,
8. stabilizing the laser emission frequency and of the secondary carrier to a TE/TM mode of the resonator,
9. given the above, at the input of the resonator the following fields are present: a) a TE and a TM fields from primary carrier oscillating at frequency $v_{laser}$ b) a TE and a TM fields generated from secondary carrier oscillating at frequency $v_{Secondary} = v_{laser} + v_{modulation}$,
10. if the step of stabilizing the laser frequency (locking the frequency) includes stabilizing the laser frequency to oscillate at a TE mode frequency of the resonator, acting for example on a feedback channel 1, the TM field at frequency $v_{laser}$ will be totally reflected by the resonator and will not impinge on the integrated sensing unit. The resonator acts as a frequency filter,
11. the frequency of Local Oscillator 1 can be locked to oscillate at the frequency of a resonator mode TM, this holds: $v_{Secondary} = v_{laser} + v_{modulation} = v_{secondary} = v_{laser} + \Delta v$. As in 10) the field component with TE polarization and oscillating at this frequency will be totally reflected by the resonator. It will not impinge on the integrated sensing unit,
12. Sequence 10) to 11) are totally symmetric regarding the TE and TM exchange, i.e. the Primary Carrier can be lock to a TM mode and that the Secondary Carrier can be Lock to a TE mode, that is, points 10 and 11 can be exchanged with the following points 10' and 11':

10'. if the step of stabilizing the laser frequency (locking the frequency) includes stabilizing the laser frequency to oscillate at a TM mode frequency of the resonator, acting for example on a feedback channel 1, the TE field at frequency $v_{laser}$ will be totally reflected by the resonator and will not impinge on the integrated sensing unit. The resonator acts as a frequency filter, 11'. the frequency of Local Oscillator 1 can be locked to oscillate at the frequency of a resonator mode TE, this holds: $v_{Secondary}=v_{laser}+v_{modulation}=v_{Secondary}=v_{laser}+\Delta v$. As in 10') the field component with TM polarization and oscillating at this frequency will be totally reflected by the resonator. It will not impinge on the integrated sensing unit.

This ensures that a TE reference mode and a TM probe mode will oscillate simultaneously in the resonator.

Preferably, the method includes the step of determining a beat of the first and second fields respectively resonant in the optical resonator.

In order to determine the difference between the first and second frequencies at which the intra-cavity TE mode is resonant in the optical resonator and the intra-cavity TM mode is resonant in the optical resonator, respectively, the beat of the two intra-cavity modes can be measured. In this way, an easy measurement is made which is dependent only on the quantity of interest (i.e. the frequency difference).

The direct readout of the beat note (BN) frequency between the TE and TM field consists in a direct measurement of the frequency gap between the TE and TM cavity modes. As described above, there are two fields simultaneously resonating in the resonator, a TE and a TM cavity mode. It is desired to detect the difference in frequency between the two, which represent the difference between the frequency of the first field and the frequency of the second field (above called $v_1$ and $v_2$ or $v_{laser}$ and $v_{secondary}$). For this purpose, the TM and TE fields transmitted by the resonator (i.e. the outputs detected from the resonator) are preferably polarization rotated in order to share a parallel component and then superimposed on the detector. A possible optical setup may include a polarizing beam-splitter is used to separate the transmitted TE field from the TM field, in two different beams. A wave-plate may be used to rotate the orientation of the TE field by 90 degree. A beam-splitter may be used to recombine of the two beams on the photodetector. Alternatively, the recombination can be obtained using a second polarizing beam-splitter. Because the two outputs which are recombined have different frequencies, beats are formed. The photodetector output is preferably then sent to a frequency counter for frequency measurements of the BN. The number of oscillation cycles made by the beat signal is related to the difference in frequency between the two outputs and thus to the refractive-index changes occurring in the medium above the SPR chip. Any direct measurement of frequency is intrinsically immune from the amplitude noise of the source and from the detection-electronics noise. The direct measurement of the BN frequency is also immune from thermal-mechanical noise and acoustic pickup coupled to the optical set-up: indeed, these fluctuations are common to both TE and TM polarized fields and thus cancel out in the signal beating.

As a more practical option for the BN readout, the frequency of the RF signal (external oscillator) that drives the Secondary Carrier around $v_{TM}$ can be directly measured. Its content is the same as the optical BN detected on the cavity transmission but no polarization rotation is needed, in this case, and the signal is already available at the phase modulating input of the laser source. The two methods are nearly equivalent, indeed two feedback channels, implemented for the simultaneous interrogation with TE and TM fields at different frequencies (see below), ensures that the LO1 frequency coincide with the beat note between two TE and TM resonator modes.

Preferably, providing the first and the second input field includes outputting the first and the second input fields by a single laser source.

In order to cancel-out laser source noise contribution, the first and the second input fields can be outputted by the same laser source. A single beam is formed by a first field having a first frequency and both a TE and TM projection components, and a second field having a second frequency and both TE and TM components. Even more preferably, the first and second input fields, up to the optical resonator and within the resonator, share the same evolution path. In this way, common mode noise can be rejected.

Preferably, providing a plasmonic sensor includes:
providing a substrate having a first and a second opposite surface, wherein on the first surface said sample to be measured is positioned, and on the second surface a prism is attached; and
impinging with the first and second input field the second surface through said prism.

The metal substrate can be deposited on the prism directly.

In the Kretschmann configuration, a metal film is evaporated onto a glass block, for example forming the prism. The light illuminates the glass block, and an evanescent wave penetrates through the metal film. The plasmons are excited at the outer side of the film. This configuration is used in most practical applications. On one side of the plasmonic sensor the sample is in contact to, and to the opposite side of the plasmonic sensor, where the prism is present, the field impinges and then—after being reflected—propagates in the optical resonator.

Preferably, the method includes:
measuring a concentration of a compound in said sample by measuring said refractive index.

This type of measurements is called "bulk measurement", because the measurement relates to a bulk characteristic of the sample. A quantity like the refractive index of the whole sample changes in time. Preferably, this quantity changes uniformly in the whole sample.

More preferably, the method includes
measuring a concentration of a compound in said sample by measuring refractive index changes.

Preferably, not the absolute value of the refractive index is measured, but its variations with respect to a previous value.

Preferably, the method includes:
determining the formation of a bond between said surface and a compound in said sample by measuring said refractive index.

Preferably, the method includes:
determining the concentration of a target analyte in the sample by monitoring the response to such chemical bond on the sensing surface.

Preferably, the determination of the concentration is performed after a functionalization of the surface for the specific target.

According to the method of the invention, both "bulk" and "surface" measurements can be performed. Bulk measurements have been explained above, i.e. it is the measurement of characteristics that are substantially uniform throughout the sample. "Surface" measurements relates to a characteristic of the surface, that is, to a characteristic of the sample to be examined which may be present only in contact to the surface of the plasmonic sensor and not in the rest of the sample. A possible case of such a situation is when there is a chemical bond forming at the surface of the plasmonic sensor between probe molecules anchored to the surface (providing for example a preliminary functionalization of the surface) and a specific target present in the sample.

Preferably calculating the refractive index of the sample from the difference between the first and second frequency includes calculating refractive index changes of the sample from changes in the difference between the first and second frequency.

The method of the invention can be used to monitor changes in the refractive index of the sample. This can be performed monitoring the changes in the difference between the first and second frequency.

Particularly useful is to detect variations in refractive index when a formation of a bond is detected. In a surface measurement, if signal changes in time are detected (that is, changes in the difference between an excited TM and a TE mode in the optical resonator), this may be due to local changes of refractive index in the neighborhood of the surface as consequence of chemical bond formation.

A signal change in case of a bulk measurement may indicate a change in the concentration of a compound in the gas or fluid in contact to the surface of the plasmonic sensor. A bulk refractive index change and a local refractive change due to chemical bond formation may be only distinguished by their different time evolution.

Considering a specific surface functionalization, for example with probe elements for selective detection of specific targets, a calibration of the response at different concentrations of the target leads to a determination of the concentration of the target element in an unknown sample.

Further, the mechanism of detection in the case of formation of bonds is based on that the adsorbing molecules cause changes in the local index of refraction, changing the resonance conditions of the surface plasmon waves and thus the BN frequency. This can also be performed in a real-time regime, so that changes in time of the refractive index can be determined.

Preferably, the method includes:
maintaining the first input field at the first frequency; and
maintaining the second input field at the second frequency.

Any process or apparatus guaranteeing the fulfillment of these simultaneous resonating conditions can be considered in the invention.

The two optical fields (first and second input field) are preferably made resonant by two separate opto-electronic locking feedbacks. Preferably, their beat note is detected.

Preferably, the two opto-electronic locking feedbacks are independent one from the other. More preferably, the independent feedbacks use preferably a Pound Drever Hall (PDH) technique. PDH relies on the generation of small optical sidebands by laser phase modulation, for example using a further phase modulation (preferably fiber-coupled Electro-Optic Modulator (EOM)) and on the measurement of the relative dephasing between the reflected light fields in the proximity of the cavity resonance.

The frequency of the first input field (laser carrier) is thus stabilized to a resonant frequency to the optical resonator, for example the frequency $v_1$ of the primary carrier is stabilized to the frequency of a TE mode of the optical resonator. However, this frequency stabilization does not guarantee the resonant condition for the TM component of the primary carrier field, because the TM modal system is frequency shifted to the TE modal system, (asymmetry due to the SPR coupling). A simultaneous resonant condition for the TM component is obtained by generation, besides PDH sidebands, of secondary carrier optical fields by applying an additional phase modulation. This generates two symmetrical sidebands apart from the primary carrier by a given $\Delta v$.

The value $\Delta v$ corresponds approximately to the TE-TM frequency distance, i.e. the birefringence effect of the SPR in the optical resonator.

Varying $\Delta v$ allows precise tuning and stabilization of the secondary carrier frequency at the TM optical resonance frequency. Therefore, the first carrier is stabilized at a frequency $v_1$ and the second carrier at a frequency $v_2 = v_1 + \Delta v$, where $\Delta v$ has been selected in order to obtain the resonance. A secondary servo loop may filter an error signal being obtained also for the secondary carrier using the PDH scheme as well.

The independence of the two feedback channel may be obtained by a physical separation of the sources of two error signals, and this is intrinsically guaranteed by the orthogonality of the two probe and reference field (TM and TE). In this embodiment, the stabilization of the primary carrier frequency is obtained by the signal provided from the detection of one polarization reflected by the optical resonator, while the signal for the other feedback loop is provided by the other polarization detected on a different photodiode. The splitting (and thus the separation) of the two polarizations delivered to different photodiodes is obtained for example by using a polarization beam splitter.

For example, if the Pound Drever Hall technique is considered for the stabilization of the laser emission frequency and of the secondary carrier to a TE/TM mode of the resonator (feedback), going back to the example above, point 9) can be expanded with two additional points as:

9a) applying an additional modulation signal (at frequency $v_{PDH}$) to the Primary Field, this can be done using the same technique in 4). The application of such additional phase modulation guarantees a dispersive signal in correspondence of the TE and TM resonator modes of the (see PDH technique). Any other feedback technique can be applied.

9b) Two independent PDH signals can be obtained by detecting the radiation reflected by the resonator, separated in a TE channel and TM channel, and by demodulating the two signals at $v_{PDH}$. (PDH technique as known in the art).

More in detail, the Primary Carrier stabilization is obtained by applying a slow modulation, because it allows to visualize, for example at the oscilloscope, some TE and TM modes from the signal obtained from the transmitted or reflected radiation. Being the central wavelength of the laser roughly equal to a TE (or TM) mode of the resonator, it is possible decrease the laser wavelength scan amplitude and simultaneously increase the feedback gain.

Regarding the Secondary Carrier stabilization, it is preferably performed once that the primary carrier has been stabilized. Local oscillator 1 is put in frequency scanning mode by applying a slow modulation. This allows to visualize, for example at the oscilloscope, one or more TM (or TE) modes from the signal obtained from the transmitted or reflected radiation. Being the central frequency of the laser roughly equal to the frequency shift between TE and TM, it is possible decrease the local oscillator 1 in frequency scan amplitude and simultaneously increase the feedback gain.

The readout technique is based on the acquisition of the beat note between the TE and TM modes, excited by the first and second fields (primary and secondary carriers), after the cavity transmission or reflection. The beat note frequency is then preferably measured by a precision counter. Similarly the readout can be obtained also by measuring the frequency of the driving local oscillator generating the secondary carrier.

Once the double stabilization feedback channels are operative, e.g. once the two frequency input fields are on-resonance within the resonator, the output readout can be also obtained by the direct sampling of the Radio Frequency Signal used for the secondary carrier generation.

Preferably, the method includes:
providing two independent feedback loops guaranteeing the simultaneous optical resonating condition for the first and second input field.

The stabilization of the first and second input field, that is, of the first and secondary carrier, take place as above described using suitable feedback loops. Preferably, the two feedback loops are independent from each other.

Preferably, the optical resonator is a Fabry-Perot cavity.

Preferably, the plasmonic sensor forms an intermediated reflecting element in the resonant optical cavity.

Preferably, the first and/or input field is provided by a laser source in the visible or infrared spectrum.

Preferably, the method includes:
positioning a source of the first and second input fields and the plasmonic sensor in such a fashion that the first and second input fields meet a surface of the plasmonic sensor at an angle of incidence (θ) enabling a surface plasmon resonance phenomenon.

In order to excite a plasmonic wave, a specific angle between the incident beam and the surface of the plasmonic sensor is formed. This angle depends on a plurality of parameters.

The described method cannot provide absolute measurement of Refractive Index of the sample (liquid or gas). Any measurement of refractive index is preferably derived from a preliminary calibration procedure. Measurements of variation of Refractive Index can be performed in any case. The calibration procedure of SPR sensors for Refractive Index measurements or for chemical sensing concentration detection is well known in the literature.

The invention will be now described with reference to the appended drawings, in which:

FIG. 1 shows schematically an apparatus 1 operating according to the method of the invention.

Figure 1:
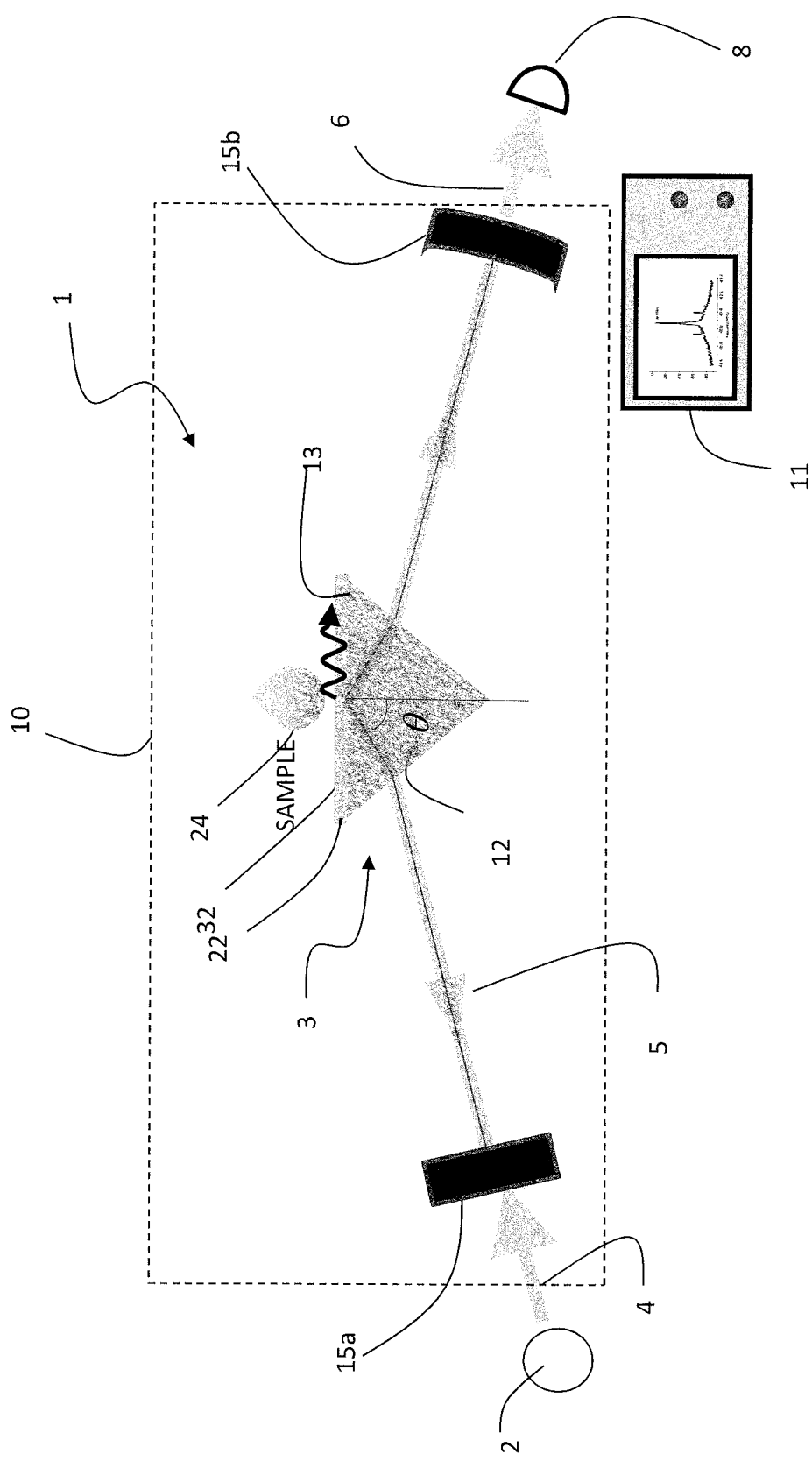
FIG. 1 is a schematic simplified diagram of an apparatus operating according to the method of the invention; the integration of the SPR sensing element in an optical resonator is depicted.

An optical source 2 provides an input field of electromagnetic radiation 4. Typically, input field 4 is substantially monochromatic at tunable wavelength. Preferably, source 2 is a laser source.

Further, the apparatus 1 includes a plasmonic sensor 3. Plasmonic sensor 3 includes a prism 12 having a surface 13. Further, the plasmonic sensor 3 comprises a metallic layer 22 having a first surface 32 and a second surface. The second surface is disposed on a surface 13 of prism 12. Alternatively, a replaceable Plasmonic chip (not depicted in the drawings) including a metallic layer positioned on the surface 13 of the prism 12 can be considered. Metallic layer 22 makes contact with its first surface 32 with a sample, for example an analyte 24, to be analyzed. The surface 32 of the metallic layer 22, opposite to prism 13, is thus a "sensing interface" where measurement takes place.

Further, apparatus 1 includes an optical resonator 10. The optical resonator may include three mirrors, however a different number of mirrors can be used as well. One of the mirrors includes the plasmonic sensor 3, and in particular it includes metallic layer 22 on which the input field 4 impinges. The other two mirrors are indicated with 15a and 15b in the drawing of FIG. 1. Mirror 15a can be considered as the input mirror, while mirror 15b can be considered the output mirror. Different optical resonator, of the Travelling-wave type, can be also considered. Wave-guided configuration with evanescent couples substituting the input and output elements can be also considered.

In the optical resonator 10, in any configuration chosen, the plasmonic sensor 3 and in particular the sensing interface 32 is preferably integrated in the optical resonator and the SPR may be coupled. Any wave-guided configuration considered is preferably intrinsically designed for a polarization-maintaining operation mode.

Input fields 4 impinges on the resonator-input-element (mirror) 15a, the intra-cavity fields 5 propagate within the prism 12, and are internally reflected within prism 12 from the surface 13 of prism 12 up to the output element 15b. Multiple reflections of the input field in resonance condition within the optical resonator 10 could lead the instauration of a stationary wave within the resonator. Output fields 6 are provided at the output element 15b (15a) as described below.

Sensing interface 32 supports propagation of a surface plasmon wave. Such a wave has a field distribution that exponentially decreases as the distance from the sensing interface increases.

Given an incidence angle and a wavelength of the input field 4, the ability of input field 4 to couple to the surface plasmon wave at sensing interface 32 is polarization-dependent. More specifically, if input field 4 is TE polarized, a TE intra-cavity field 5 will be obtained, for a given frequency, and the coupling to the surface plasmon wave cannot occur, while if input field 4 is TM polarized, a TM intra-cavity field 5 will be obtained, for a given frequency, and coupling to the surface plasmon wave can occur. Generally, the input field 4 includes both a TM and a TE component. Thus, the output field 6 corresponding to the TE component is not affected by the surface plasmon wave, and thus it is substantially independent of the refractive index of sample 24. On the other hand, the TM component of input field 4 provides an output field 6, which corresponds to a field 5 that couples to the surface plasmon wave, and thus is dependent on the refractive index of sample 24.

The optical resonator 10 operates as a spectral filter, only a discrete set of frequencies of input field frequency allows the commutation of an input field in an intra-cavity filed. Considering an input field with both TE and TM projection components and a variable frequency, there is a first frequency $v_1$ of the input field 4 for which the TE component is resonant in the optical resonator 10 at a given time $t_1$ and a second frequency $v_2$ at which the TM component of the input field 4 is resonant in the optical resonator 10 at a given time $t_2$. That is, the two input fields having frequencies $v_1$ and $v_2$ are inputted at two different instant $t_1$ and $t_2$ during the tuning of the source.

Output fields 6 are received by a detection system 8, information about the intra-cavity fields 5 can be retrieved by the detection of the output field 6.

The apparatus 1 further includes a processor 11.

The measured characteristics of the output fields 6 provided by the detection system 8 are provided to the processor 11 for determining a refractive index of sample 24.

The difference between $v_1$ and $v_2$ calculated by processor 11, being dependent on the strength of the coupling between the TM component of the input field to the surface plasmon wave, gives a measure of the refractive index of the sample 24.

EXAMPLE 1

As a source 2 it is used a near-infrared laser, a narrow linewidth Er-doped fiber laser emitting at 1560 nm (Koheras Adjustik) with a linearly polarized output.

A supplementary function generator 7 periodically scans the laser frequency around a medium value. This is not necessary for the present invention, but it can show the different resonances in case a single field is used.

The plasmonic sensor 3 includes a gold-coated chip 22, called SPR chip in the following.

The SPR chip was fabricated by subsequent deposition of a 5-nm Cr adhesion layer and 50-nm Au plasmon supporting layer on a BK7 glass slide using thermal evaporation in vacuum (pressure $3 \times 10^{-6}$ mbar, temperature 150° C.).

In order to satisfy the phase-matching condition between the radiation wave-vector and the surface plasmon propagation constant, the SPR chip is attached to the base 13 of a right-angle antireflection coated prism 12 in the Kretschmann geometry.

The metal surface 32 of the chip 22 facing out of the prism 12 is interfaced with a microfluidic flow-cell. A liquid sample 24 can be delivered to the chip by a microfluidic pump.

An optical resonator 10 is built around the SPR chip, which is used as an intermediate mirror of the optical resonator 10, using two additional mirrors 15a, 15b (FIG. 1). The chip acts as an intermediate mirror with variable reflectivity. The two mirrors 15a, 15b have a reflectivity >95%, one flat (input mirror 15a) and one plano-convex with a 2-m radius of curvature (15b). The mirrors 15a, 15b form with the chip element a standing-wave Fabry-Pérot resonator in a V-shape configuration (FIG. 1). The total resonator length is 0.53 m corresponding to a free-spectral-range of approximately 280 MHz.

The optical resonator 10 and the chip 22 are preferably enclosed in a small insulating box to reduce drifts due to ambient temperature fluctuations.

The polarization of the input field 4 emitted by the Er-doped fiber laser 2 is preferably rotated by 45° prior to the optical resonator input to obtain a superposition between a s-polarized wave and a p-polarized wave, i.e. transverse electric (TE) and transverse magnetic TM states with respect to the SPR incidence plane.

Figure 2:
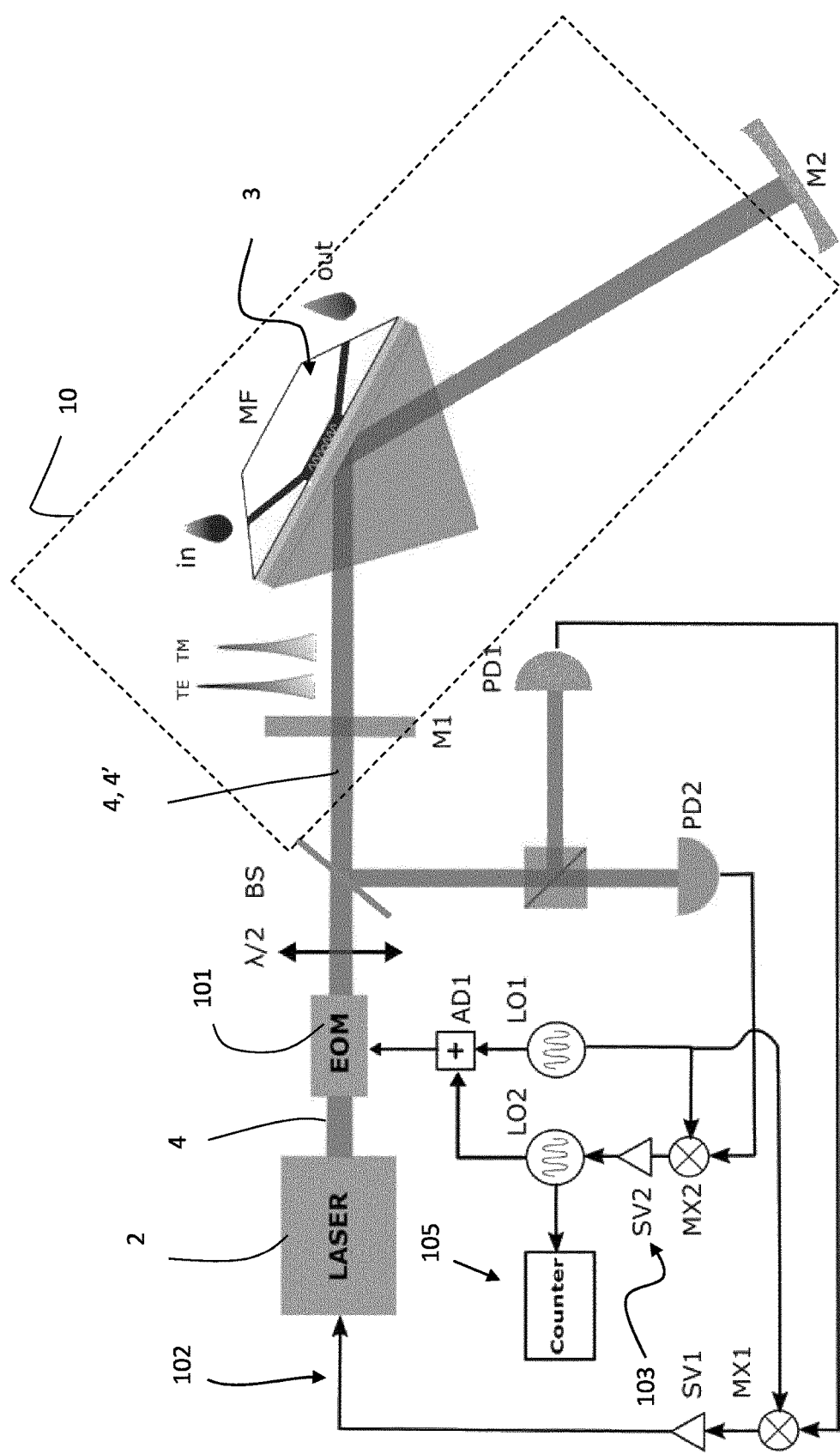
FIG. 2 is a more detailed schematic diagram of the apparatus of FIG. 1 operating according to the method of the invention, the optoelectronic implementation for a possible realization is detailed.

A more detailed view of the apparatus 100 according to the invention is depicted in FIG. 2. The apparatus includes a plasmonic sensor 3 as described in the previous embodiment of FIG. 1 as well as the same type of optical resonator 10.

As in FIG. 1, the source 2 generates a first input field 4 having a TE and a TM components, where only p-polarized radiation can excite the surface plasmons. Due to the SPR anomalous dispersion, the intra-cavity p-polarized radiation experiences a different round-trip optical path as compared to the non-interacting s-polarized one and the cavity exhibits two corresponding orthogonally-polarized sets of eigenstates with distinct resonance frequencies.

A second input field 4' is directed towards the plasmonic sensor 3. These two input fields 4, 4' may be a primary carrier and a secondary carrier of a laser field.

The optical resonator 10 acts as a frequency filter, therefore only intra-cavity fields at given frequency can be resonant in the resonator 10. Being two fields present at the same time, that is input fields 4 and 4', a "simultaneous resonance condition" can be obtained in the optical resonator 10, as detailed below.

In order to obtain the secondary carrier, that is second field 4', the first input field 4 is phase modulated to generate a secondary optical frequency. For this purpose apparatus 100 includes a modulator 101, for example fiber-coupled electro-optic modulator (EOM), (the modulation can be also applied directly to the laser pumping current using a bias-tee as RF input stage). The simultaneous resonant condition is accomplished generating the secondary optical field 4' by RF phase modulation of the first field 4. The resulting sidebands can be tuned acting on the external synthesizer that drives the modulator, of which only one is used to excite the TM cavity mode.

As soon as it has been determined a first frequency for which the first field has its TE component resonant in the optical resonator 10 and the second frequency at which the second field has its TM component resonant in the resonator, the two fields are simultaneously stabilized to the TE and TM eigenmodes resonances, respectively. That is, the first and second fields keep the first and the second frequency as long as those frequencies lead to a resonance.

In order to obtain the stabilization, the apparatus 100 includes a first 102 and a second 103 feedback loops, which are independent one from the other. For example, the feedback loops 102, 103 use two separate Pound-Drever-Hall stabilization schemes.

The difference between the first and second frequency of the resonant intra-cavity fields, which are resonating at the same time, is obtained measuring the beat note of the two resonant intra-cavity fields. Indeed, simultaneous excitation of these two modes results in a frequency beat on the output field 6 emerging from the optical resonator 10.

The beat note between the two resonating field can be detected from one resonator power output channel, for example in an analogous configuration as depicted in FIG. 1, by a photodiode 6 positioned after mirror 15b. Alternatively the beat note central frequency can be retrieved by the acquiring the output of a synthesizer L02, and the frequency output can be measured by a digital counter (105). This frequency carries only information on the plasmon-induced differential dispersion between the eigenmodes while most other noise contributions are cancelled out. In order to directly detect the beat note between the TE and TM output field a system dedicated to rotation and overlap of such orthogonal fields is further needed.

Figure 3:
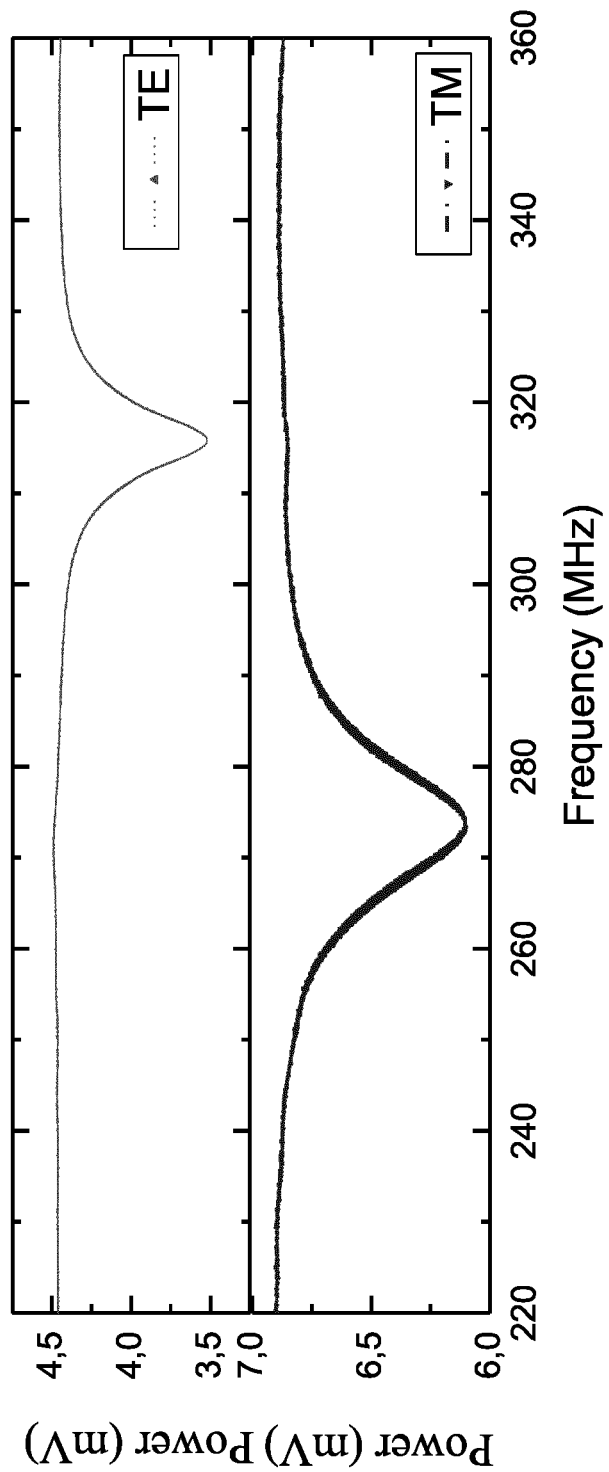
FIG. 3 is a first step according to the method of the invention in scanning regime. From top to bottom: signal marking the TE polarization mode, obtained from TE channel (PD1) of the resonator reflection power; signal marking the TM polarization mode, obtained from TM channel of the resonator reflection power, (PD2) (SPR far detuned regime, sample air, TE-TM distance of 50 MHz)

Signal form typical output fields 6 (or 6' back/forward) are depicted in FIG. 3. In this figure the intra-cavity TE and TM modes are marked on the resonator reflection signal in scanning operation mode. This figure is obtained via laser tuning of the frequency of a single field as detailed in Example 1 and it is shown only to visualize the resonance.

EXAMPLE 2

A SPR chip 2 is mounted on a microfluidic cell and integrated as intermediate mirror of an optical resonator 10. The configuration is analog to the one of Example 1.

The laser source 2 emits a first primary carrier 4 and a secondary carrier 4' generated by modulator 101. In order to keep the laser emission frequency, i.e. the primary carrier frequency, stably resonant with a given cavity TE mode, a first feedback channel 102 is realized by means of the Pound Drever Hall (PDH) technique.

The laser beam underwent a further phase modulation to generate frequency discriminator signals around each resonance by heterodyne detection of the radiation reflected by the cavity, i.e. a PDH scheme (see details below). Then, the two optical fields 4, 4' were made resonant by two separate opto-electronic locking feedback 102, 103 and their beat note on the cavity transmission was detected by a PIN InGaAs photodiode and frequency measured by a digital electronic counter.

PDH relies on the generation of small optical sidebands by RF laser phase modulation (6.1 MHz, in our case) with the fiber-coupled electro optic modulator 101 and on the measurement of the relative dephasing between the reflected light fields in the proximity of a cavity resonance. Phase sensitive detection of the reflected radiation is carried out in a RF mixer that yields a symmetric, dispersive-like signal crossing zero at the resonance center, which serves as the error signal of a proportional integrative servo amplifier SV1. PC stabilization to a TE mode is obtained by feeding the servo output to a piezoelectric actuator controlling the laser wavelength (not visible in the figures because integrated in the laser). The single primary carrier frequency lock does not guarantee the resonant coupling of the p-polarized field to a TM mode too, because of the frequency shift between the TM and TE spectra. A simultaneous resonant condition is obtained by generation, besides PDH sidebands, of secondary carrier (SC) optical fields by applying an additional phase modulation that generates two symmetrical sidebands apart from the carrier by about $\Delta v=50$ MHz (only one of them being actually used in the experiment). The value $\Delta v$ corresponds approximately to the TE-TM frequency distance, i.e. the birefringence effect of the SPR in the optical cavity. This configuration is realized using the same EOM used for the PDH, here driven by an analogically-tunable digital synthesizer (DS). Varying $\Delta v$ allows precise tuning and locking of the SC at the TM resonance position by a secondary servo, an error signal being obtained also for the SC using the PDH scheme as well (FIG. 2). In the latter case, the secondary feedback acts with an analogic voltage directly on the DS. The readout technique is based on the acquisition of the beat note between the TE and TM modes, excited by the PC and SC respectively, after the cavity transmission or reflection. The beat note frequency can be then measured by a precision counter. Alternatively the readout can be directly obtained by sampling the signal provided by the frequency tunable oscillator that generated the SC.

Further in the figure AD1 is a Radio Frequency combiner, MX1, MX2 Radio Frequency Mixer (returns a voltage signal proportional to the dephasing between the two input signals, if the two input frequency are different the output signal will oscillate at the frequency difference of the outputs), PD1, PD2 fast photodetector, Counter is a device that counts the oscillation of an RF signal returning the readout of the frequency.

The response of the apparatus 100 and the calibration work as follows.

Figure 4:
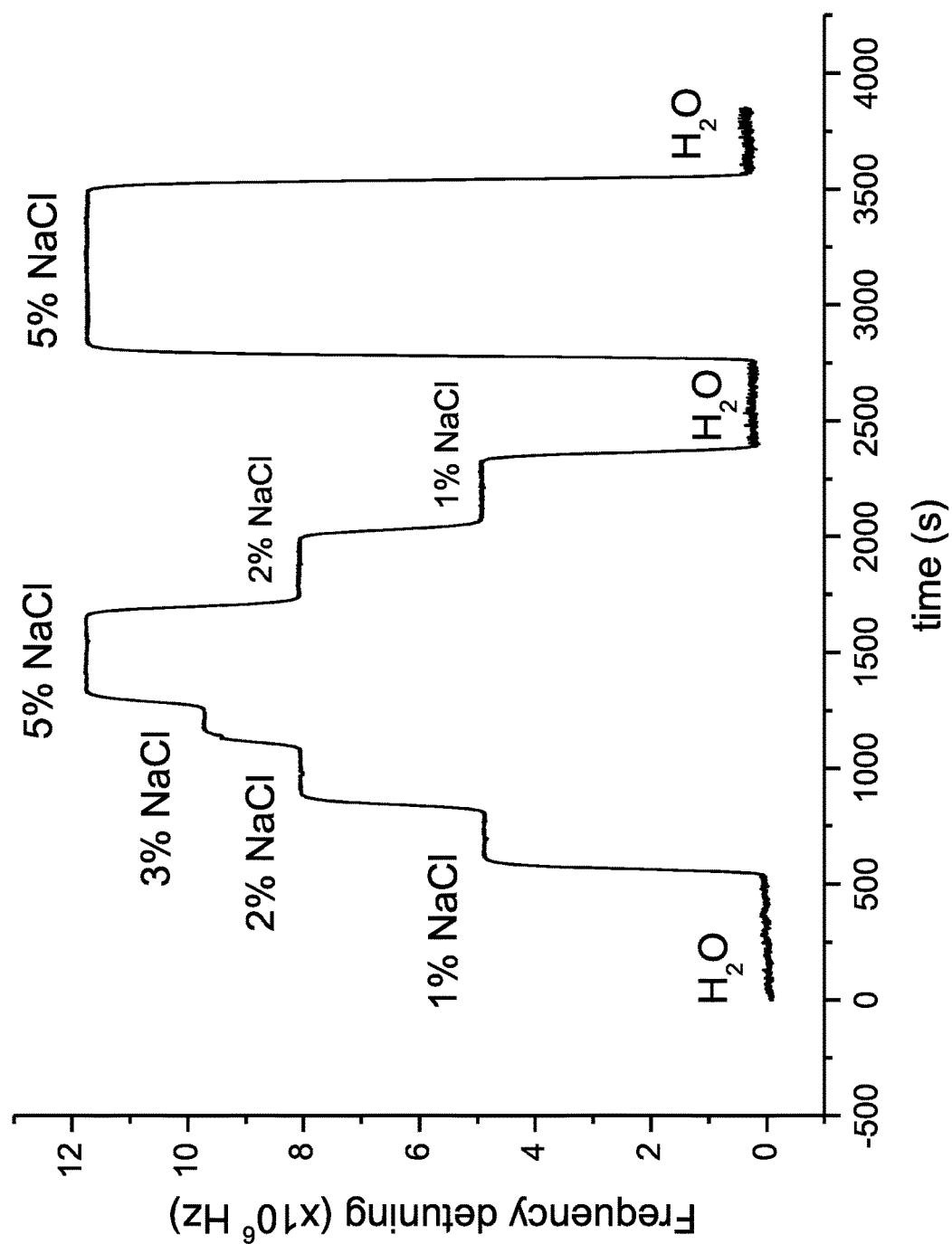
FIG. 4 is a second step according to the method of the invention. Frequency response to liquid samples calibrated in Refractive Index, consisting in solution of NaCl at different concentrations in weight in $H_2O$, a calibration (black points) of the system response is thus obtained from there.

The frequency response of the apparatus to Refractive Index Changes can be retrieved acquiring the TE-TM spectral mode distance for large refractive index steps. The typical response to RI steps is obtained using calibrated NaCl/water mixtures with salt concentrations between 0% and 5% in weight, corresponding to Refractive Index from n=1.32 to n=1.33 (considering@1560 nm wavelength). The resulting plot is represented in FIG. 4, data are obtained via real-time acquisition in closed loop regime while different samples flowing in sequence in the microfluidic guiding system. The first derivative of the step feature plot returns a sensitivity plot.

Once the corresponding orthogonally-polarized cavity eigenmodes are made both resonant, the SPR resonator output signal 6 acts as a heterodyne clock oscillating at the TE-TM frequency difference. The conversion from RI to the beat-note frequency is characterized point by point over the entire dynamic range as it depends on the SPR coupling condition. However, an average sensitivity of ~$2 \cdot 10^9$ Hz/RIU is retrieved around its linear slope for n=1.324 in this configuration and with the considered chip. Of course, the central operation region may be shifted toward smaller or larger RI values by adjusting the angle at which the laser beam impinges on the SPR chip. A different sensitivity could correspond to a different chip integrated in the system.

Figure 5:
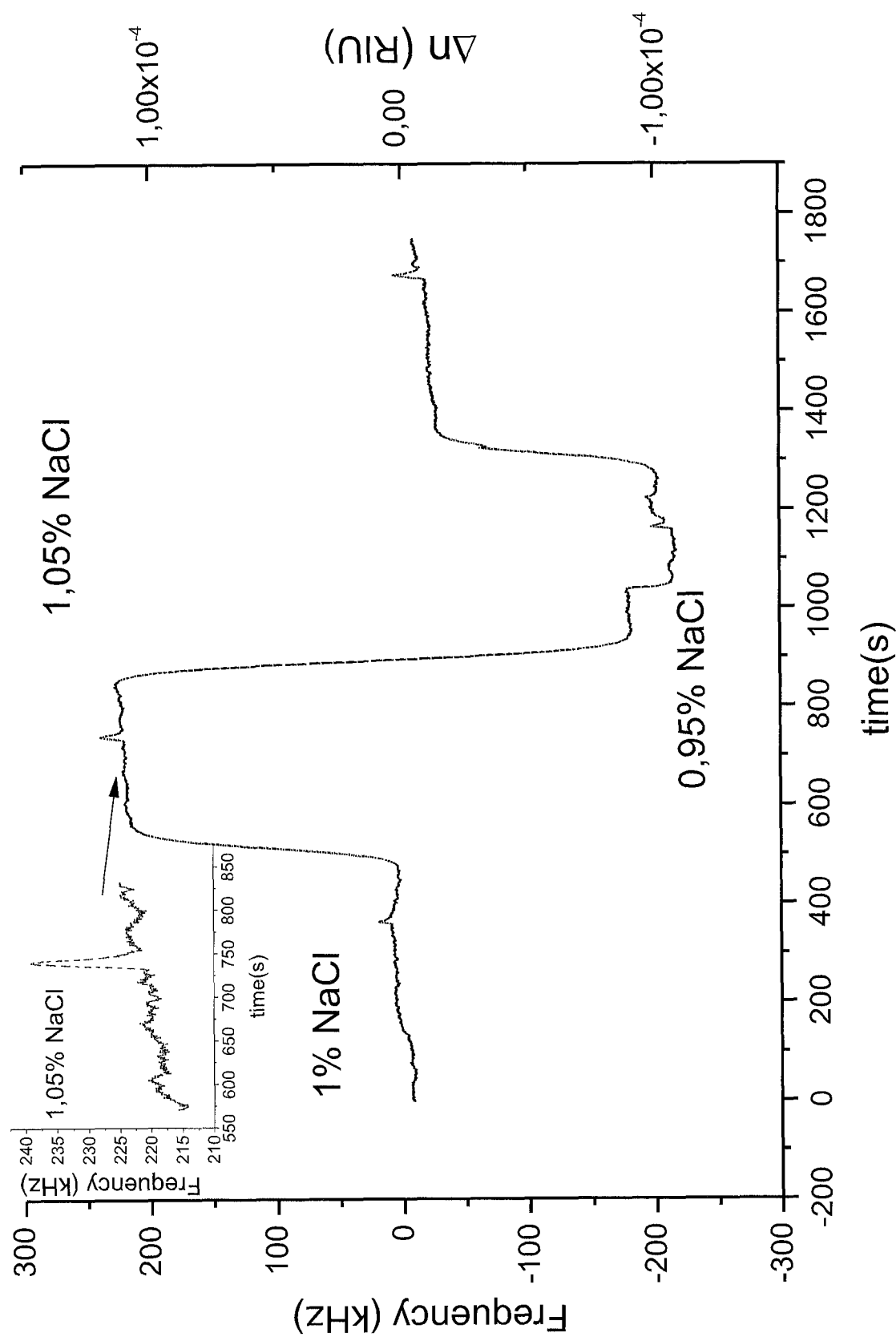
FIG. 5 shows the SPR sensor response to small RI changes for NaCl concentration steps of ±0.05% in $H_2O$ around 1% baseline. Inset: zoomed detail of the 1.05% step with noise level.

In FIG. 5 is plotted the beat-note clock frequency vs. RI in order to show the apparatus 100 response to small RI changes for concentration changes of 0.05%, around an average salt concentration of 1%, corresponding to RI steps of $1 \times 10^{-4}$ (RIU, refractive index unit). The sensor resolution was investigated through repeated noise acquisitions of the RF output signal while a known, constant RI is maintained at the surface of the SPR chip.

Transient variations corresponding to stops of the microfluidic pump, necessary for the sample replacement, are also evidenced by small spikes visible on each step of FIG. 5. These are due to local concentration gradients at the cell volume and highlight the fast, real-time response of the overall readout system. Steps on the right part of the plot marks the possible creations of bubbles or concentrations gradients inside the microfluidic system.

EXAMPLE 3

Streptavidin detection via receptors covalently bound on a SPR chip surface was studied.

Immobilization of streptavidin via covalent bond to a mixed self-assembled monolayer (SAM) of alkanethiols on a SPR chip surface was obtained.

A mixed self-assembled monolayer (SAM) of alkanethiols was firstly deposited on the SPR chip surface. The cleaned SPR chip surface was functionalized with a mixed SAM by incubating the chip in degassed absolute ethanol with a mixture (7:3) of 11-mercapto-1-undecanol and 16-mercaptohexadecanoic acid with a final concentration of 200 µM/l. After the formation of the mixed SAM, the chip was removed from the solution, rinsed with absolute ethanol and deionized water, dried with nitrogen and immediately mounted to a microfluidic cell and integrated as intermediate mirror of an optical resonator of the apparatus 100 according to the invention depicted in FIG. 2.

The streptavidin immobilization procedure started with the activation of the mixed SAM and was performed in situ by injecting sodium acetate buffer (10 mM, pH 5.0) (SA10) followed by a (1:1) mixture of N-hydroxysuccinimide (0.1 M) (NHS) and 1-ethyl-3-(3-dimethylaminopropyl) carbodiimide (0.5 M) (EDC) for 200 s and SA10 again. Then streptavidin in SA10 at a molar concentration of ~800 nM (50 µg/ml) was flowed along the surface at about 25 µl/min to be covalently bound to the activated carboxyl terminal groups of 6-mercaptohexadecanoic acid. Upon reaching equilibrium (after 20 min), the surface of the chip was washed with SA10 again.

To confirm and determine the extent of the streptavidin immobilization, the kinetic response to streptavidin binding was monitored by means of the apparatus according to the invention depicted in FIG. 2.

The SPR optical coupling condition, for a given wavelength, was tuned close to the resonance center by slightly changing the light beam incidence angle at the chip. The laser and its secondary carrier field were initially locked to provide a beat frequency of about 31.2 MHz. A sensorgram showing a temporal response to the covalent attachment of streptavidin to the activated sensor surface is shown in FIG. 6.

Figure 6:
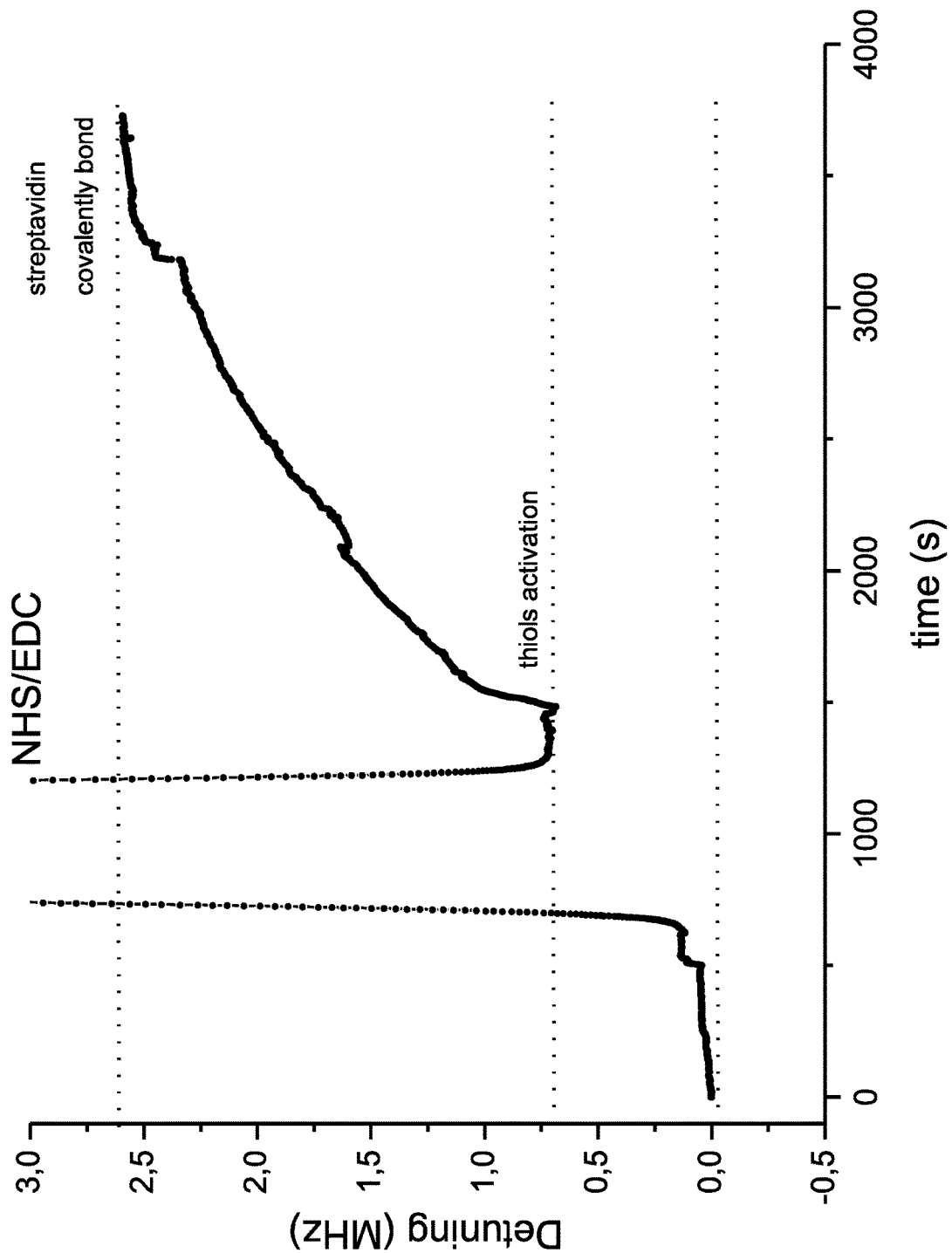
FIG. 6 shows the SPR optical clock response to a sample with a given streptavidin concentration. Streptavidin binding occurs in the time range after 1500 s and 4000 s.

In FIG. 6, the kinetic response to streptavidin binding is clearly visible as a steep increase of the beat-note frequency from ~0.75 to ~2 MHz i.e. from 1500 s.

Figure 7:
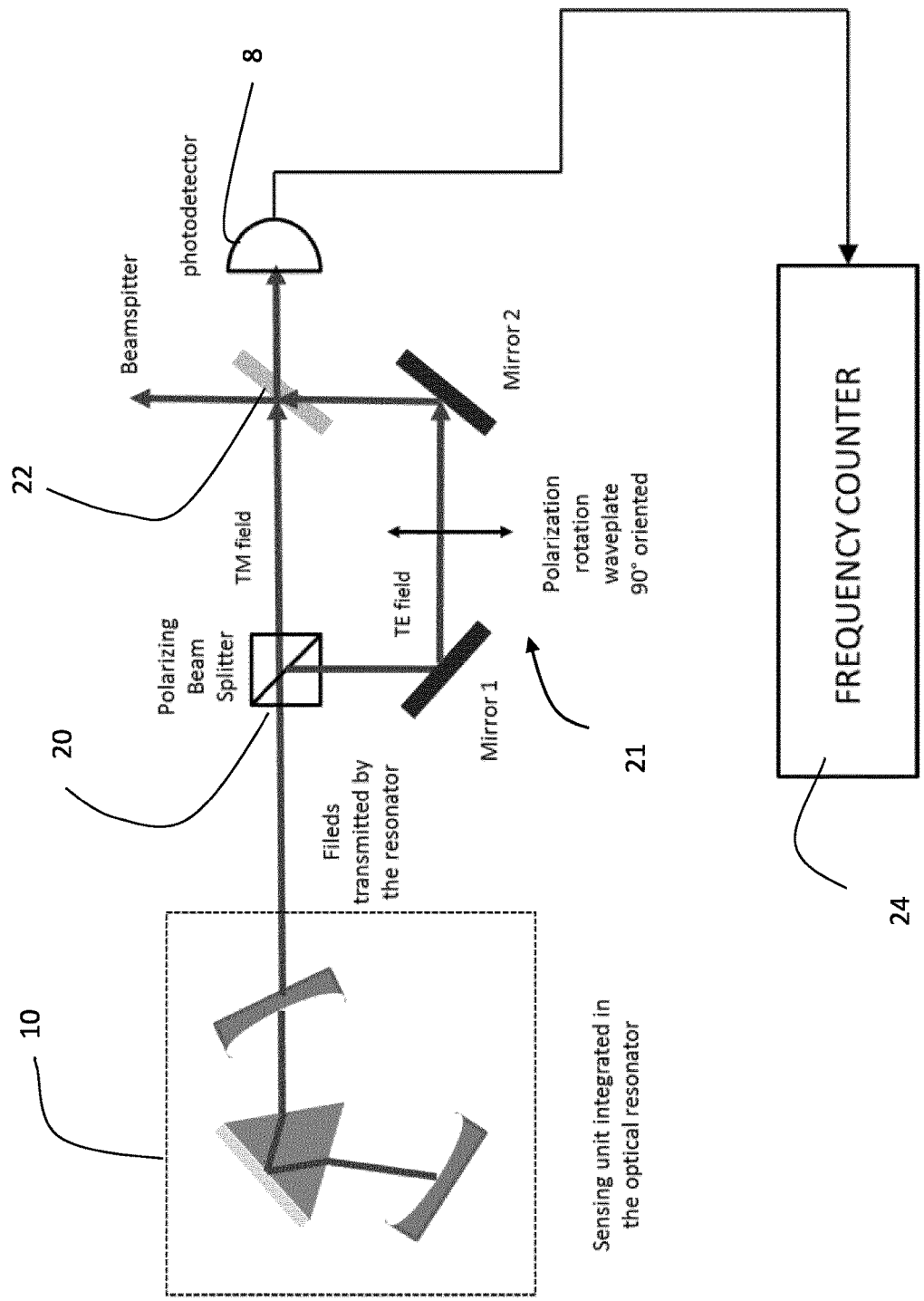
FIG. 7 shows a first embodiment of an apparatus to read the beats of the resonating TE and TM modes.
Figure 8:
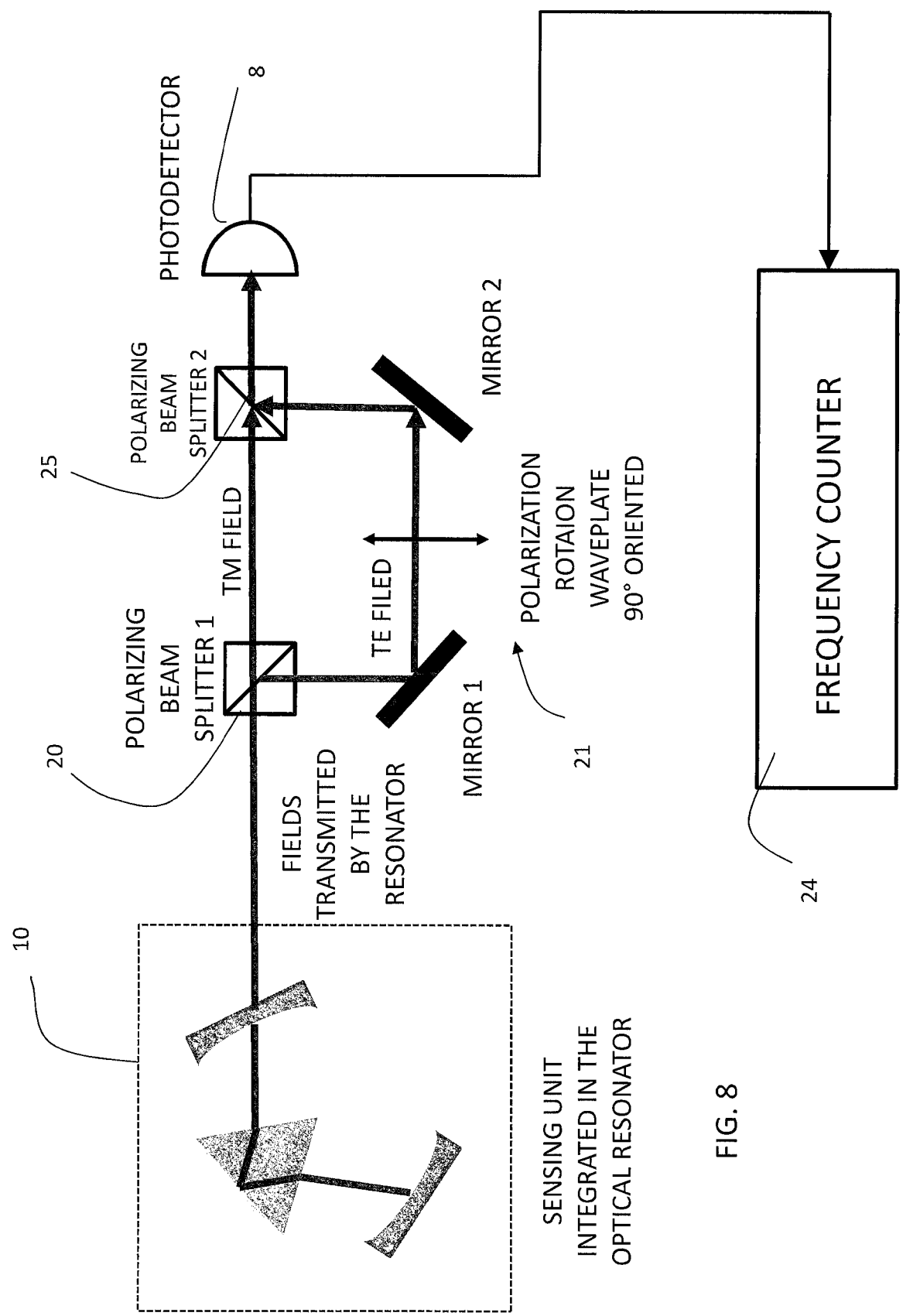
FIG. 8 shows a second embodiment of an apparatus to read the beats of the resonating TE and TM modes.

The direct readout of the beat note (BN) frequency between the TE and TM field consists in a direct measurement of the frequency gap between the TE and TM cavity modes. For this purpose, the TM and TE fields transmitted by the resonator 10 are polarization rotated in order to share a parallel component and then superimposed on the photodetector 8. A possible optical setup is depicted in FIG. 7. Here, a polarizing beam-splitter 20 is used to separate the transmitted TE field from the TM field, in two different beams. A wave-plate 21 is used to rotate the orientation of the TE field by 90 degree. A beam-splitter 22 is used to recombine of the two beams on the photodetector 8. Alternatively, the recombination can be obtained using a second polarizing beam-splitter 25 as depicted in FIG. 8. The photodetector output is sent to a frequency counter 24 for frequency measurements of the beat note. The number of oscillation cycles made by the beat signal is related to the refractive-index changes occurring in the medium above the SPR chip.

Any direct measurement of frequency is intrinsically immune from the amplitude noise of the source an d from the detection-electronics noise. The direct measurement of the BN frequency is also immune from thermal-mechanical noise and acoustic pickup coupled to the optical set-up: indeed, these fluctuations are common to both TE and TM polarized fields and thus cancel out in the signal beating.

Figure 9:
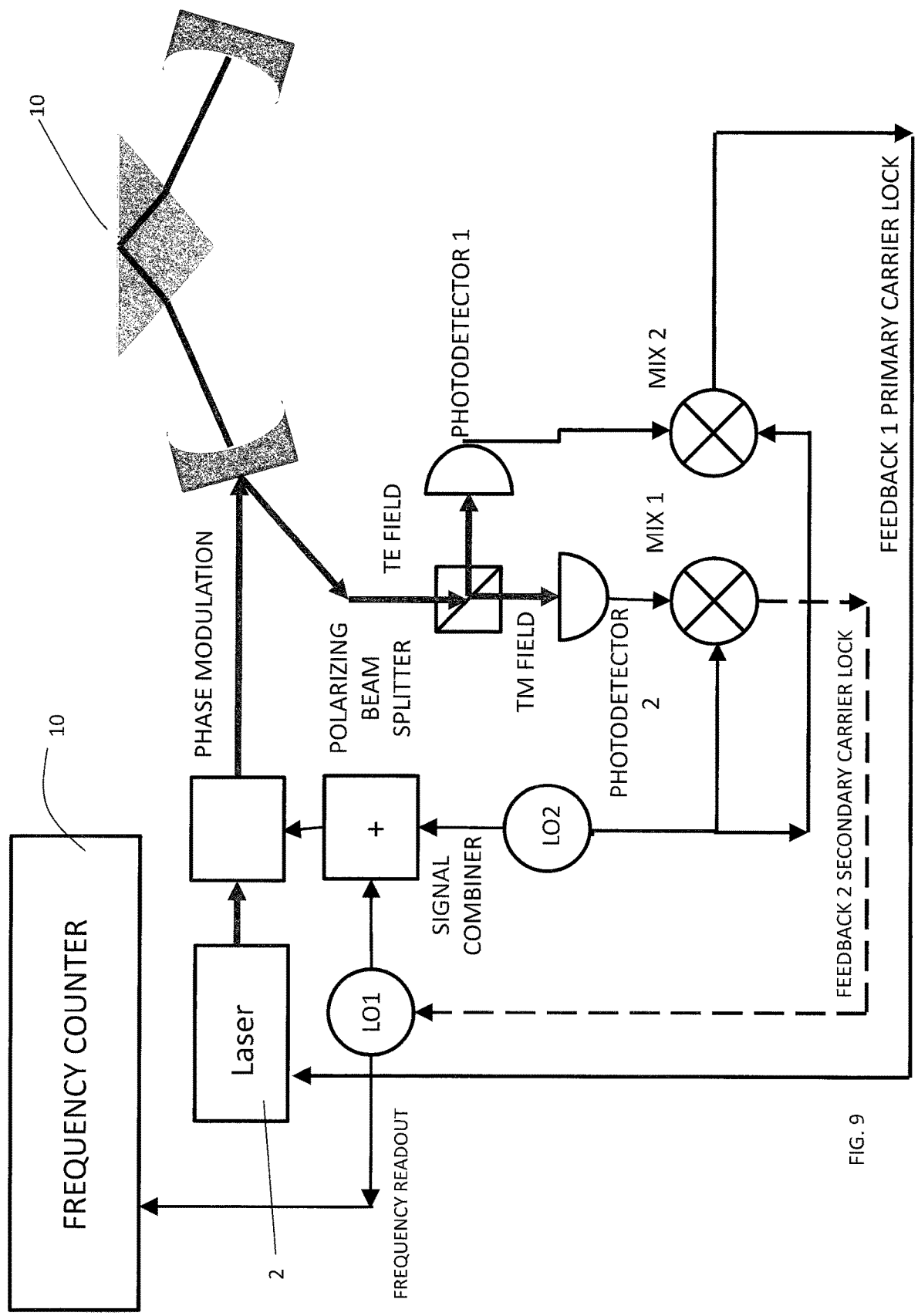
FIG. 9 shows a third embodiment of an apparatus to read the beats of the resonating TE and TM modes (directly from Local Oscillator)

As a more practical option for the BN readout, the frequency of the RF signal (external oscillator) that drives the Secondary Carrier around $v_{TM}$ can be directly measured. Its content is the same as the optical BN detected on the cavity transmission but no polarization rotation is needed, in this case, and the signal is already available at the phase modulating input of the laser source (FIG. 9). The two methods are nearly equivalent, indeed two feedback channels, implemented for the simultaneous interrogation with TE and TM fields at different frequencies (see below), ensures that the LO1 frequency coincide with the beat note between two TE and TM resonator modes.

The described method cannot provides measurement relative of Refractive Index of the sample (liquid or gas), not absolute. Any measurement of refractive index must be derived from a preliminary calibration procedure. Measurement of variation of Refractive Index can be performed in any case. The calibration procedure of SPR sensors for Refractive Index measurements or for chemical sensing concentration detection is well known in the literature.

The calibration procedure for measurement of refractive index in bulk medium can be performed simply by recording and plotting the sensor response to calibrated samples with well-known Refractive Index at the given wavelength and temperature. Different steps of refractive index can be considered.

This calibration is described for example in:
Giorgini, A., Avino, S., Malara, P., Gagliardi, G., Casalino, M., Coppola, G., . . . & De Natale, P. (2013). *Surface plasmon resonance optical cavity enhanced refractive index sensing. Optics letters,* 38(11). 1951-1953.
Piliarik, M., Párová, L, & Homola, 1. (2009). *High-throughput SPR sensor for food safety. Biosensors and Bioelectronics,* 24(5), 1399-1404.

This calibration procedure can be implemented for liquid samples as for as for gasses. The measurement of the refractive index for an unknown sample can be derived by interpolating the obtained sensor response to the calibration curve.

Figure 10:
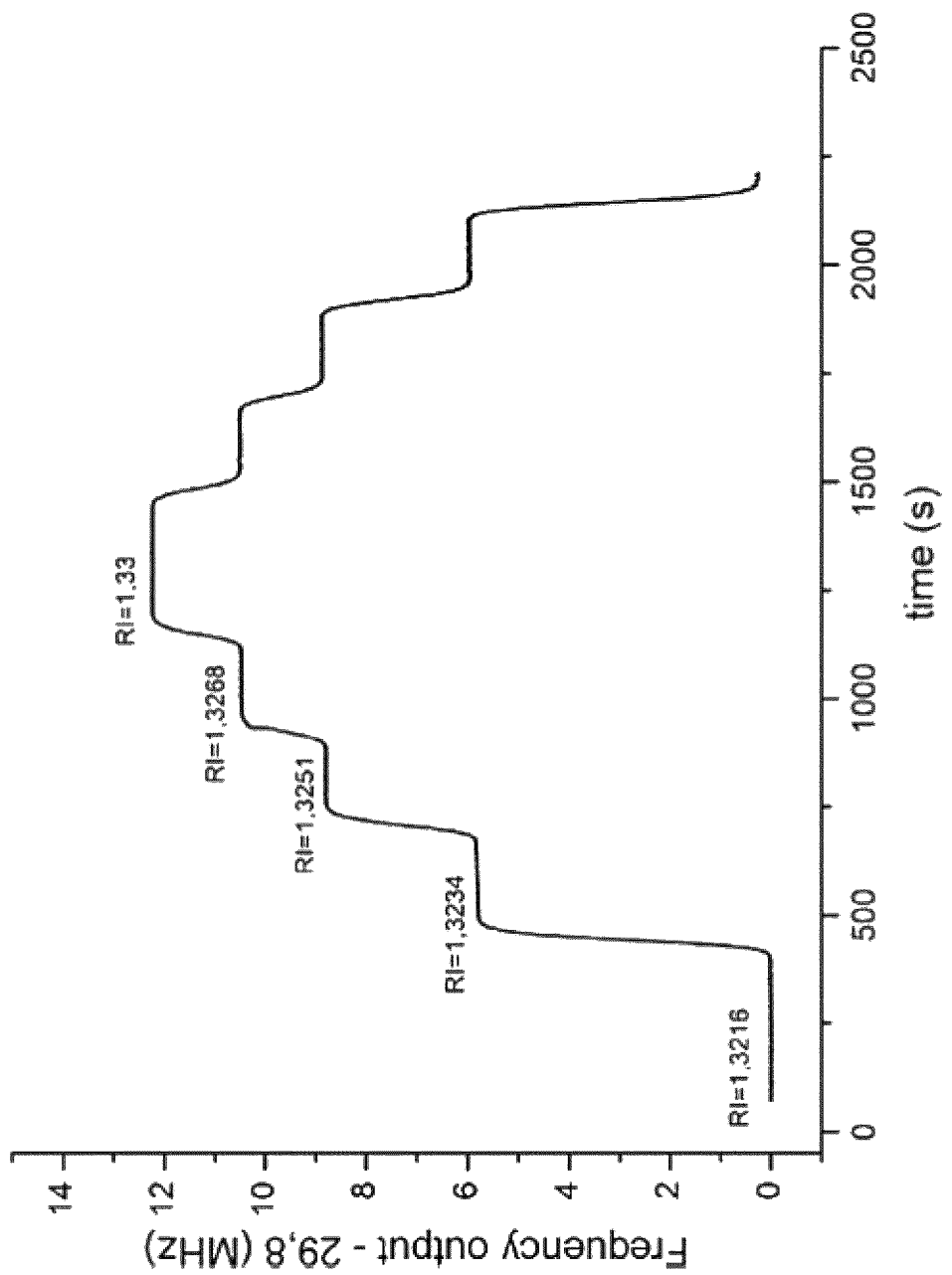
FIG. 10 shows a calibration curve.

An example of a calibration curve is given in FIG. 10.

If we are considering selective chemical sensing via affinity based protocol an approach similar to RI measurements in bulk sample must be implemented for calibrating the sensor response. In this case, the goal consist into the quantitative measurement of the concentration of an analyte dissolved in a liquid sample. The target analyte will be captured by a ligand that functionalize the SPR sensing surface. In this case the response of the sensor to the given target analyte must be evaluated. For a given SPR sensing architecture the response will depend from the chemical scheme that is considered (ie the chip functionalization and the target analyte), said protocol. Once a chemical sensing scheme (chemical protocol) has been considered, the calibration of the sensor can be obtained recording and plotting the response to samples with well-known concentration of dissolved target analyte. In some cases the slope of the variation of the sensor response due to chemical activity on the sensing surface is detected, in other cases the plateaux value, obtained once the chemical target at the given concentration is bond to the surface ligand, is detected. In many cases, depending on the chemical protocol, once a detection at a given target concentration has been performed, it is impossible to regenerate the chip for a new sequential measurement. Thus a sequence of calibration measurement, at different target concentrations, must be repeated using many identical functionalized SPR chip. If one wants to account for differences in chip fabrication, the measurement must be repeated many time for a single. This will allow to obtain a statistics that accounts both for for chip characteristic and for variations in functionalization efficiency. For examples see:
Biacore T M, *Concentration Analysis Handbook,* BR-1005-12 Edition AB
Navratilova, I., & Myszka, D. G. (2006). *Investigating biomolecular interactions and binding properties using*

SPR biosensors. In *Surface plasmon resonance based sensors* (pp. 155-176). Springer, Berlin, Heidelberg.

Adam, P., Piliarik, M., Šípová, H., Špringer, T., Vala, M., & Homola, J. (2012). Surface plasmons for biodetection. *Photonic Sensing: Principles and Applications for Safety and Security Monitoring*, 1-58.

Piliarik, M., Bocková, M., & Homola, J. (2010). *Surface plasmon resonance biosensor for parallelized detection of protein biomarkers in diluted blood plasma. Biosensors and Bioelectronics*, 26(4), 1656-1661.

Špacková, B., Lynn Jr, N. S., Slabý, J., Šípová, H., & Homola, J. (2018). *A route to superior performance of a nanoplasmonic biosensor: consideration of both photonic and mass transport aspects. ACS Photonics*, 5(3), 1019-1025.

The invention claimed is:

1. A method to measure the refractive index of a sample, the method comprising:

providing a plasmonic sensor capable to allow, upon illumination with electromagnetic radiation, a surface plasmon resonance condition, the plasmonic sensor comprising a sensing surface in contact with the sample to be measured;

providing an optical resonator having an output channel, the plasmonic sensor being integrated in the optical resonator as a reflecting surface of the same;

providing a first input field of electromagnetic radiation as a primary carrier having a first frequency and having a TE and/or a TM polarized component with respect to the sensing surface;

providing a second input field of electromagnetic radiation as a secondary carrier having a second frequency different from the first frequency and defined as:

second frequency=first frequency+$\Delta v$ where $\Delta v$ is the frequency difference between the first frequency and the second frequency, and having a TE and/or a TM polarized component, the first and second input field being part of the same beam and travelling along the same optical path;

impinging simultaneously with the first and second input field the plasmonic sensor integrated in the optical resonator so as to excite two orthogonally-polarized modes of the optical resonator to produce a first and second intra-cavity field in the optical resonator corresponding to the TE or TM component of the first input field and to the TM or TE component of the second input field;

tuning the frequency of the first field and/or the value of $\Delta v$ till the value of the first frequency and the value of the second frequency are such that the first intra-cavity field corresponding to the TE field or TM field component of the first input field is resonating in the optical resonator and the second frequency at which the second intra-cavity field corresponding to the TM field or TE field component of the second input field is resonant in the optical resonator simultaneously, obtaining a first resonating frequency and a second resonating frequency;

detecting a resonator output power corresponding to the first and second intra-cavity fields resonating in the optical resonator;

determining a difference between the first resonating frequency and the second resonating frequency by determining a beat of the reflected first and second input fields resonant in the resonant optical cavity; and calculating the refractive index of the sample from the difference between the first and second frequency.

2. The method according to claim 1, wherein providing the first and the second input fields includes outputting the first and the second input fields by a single laser source.

3. The method according to claim 1, wherein providing a plasmonic sensor includes:

providing a substrate having a first and a second opposite surface, wherein on the first surface said sample to be measured is positioned, and on the second surface a prism is attached; and impinging with the first and second input fields the second surface through said prism.

4. The method according to claim 1, further comprising:

measuring a concentration of a compound in said sample by measuring said refractive index.

5. The method according to claim 1, further comprising:

determining the formation of a bond between said surface and a compound in said sample by measuring said refractive index.

6. The method according to claim 1, further comprising:

maintaining the first input field at the first resonating frequency; and maintaining the second input field at the second resonating frequency after the resonant condition has been determined.

7. The method according to claim 6, further comprising:

providing two independent feedback loops guaranteeing the simultaneous optical resonating condition for the first and second input field.

8. The method according to claim 1, wherein the optical resonator is a Fabry-Perot cavity.

9. The method according to claim 1, wherein the plasmonic sensor forms an intermediated reflecting element in the optical resonator.

10. The method according to claim 1, wherein the first and/or input field is provided by a laser source in the visible or infrared spectrum.

11. A method to measure the refractive index of a sample, the method comprising:

providing a plasmonic sensor capable to allow, upon illumination with electromagnetic radiation, a surface plasmon resonance condition, the plasmonic sensor comprising a sensing surface in contact with the sample to be measured;

providing an optical resonator having an output channel, the plasmonic sensor being integrated in the optical resonator as a reflecting surface of the same;

providing a first input field of electromagnetic radiation as a primary carrier having a first frequency and having a TE and/or a TM polarized component with respect to the sensing surface;

providing a second input field of electromagnetic radiation as a secondary carrier having a second frequency different from the first frequency and defined as:

second frequency=first frequency+$\Delta v$ where $\Delta v$ is the frequency difference between the first frequency and the second frequency, and having a TE and/or a TM polarized component, the first and second input field being part of the same beam and travelling along the same optical path;

impinging simultaneously with the first and second input field the plasmonic sensor integrated in the optical resonator so as to excite two orthogonally-polarized modes of the optical resonator to produce a first and second intra-cavity field in the optical resonator corresponding to the TE or TM component of the first input field and to the TM or TE component of the second input field;

tuning the frequency of the first field and/or the value of $\Delta v$ till the value of the first frequency and the value of the second frequency are such that the first intra-cavity field corresponding to the TE field or TM field component of the first input field is resonating in the optical resonator and the second frequency at which the second intra-cavity field corresponding to the TM field or TE field component of the second input field is resonant in the optical resonator simultaneously, obtaining a first resonating frequency and a second resonating frequency;

detecting a resonator output power corresponding to the first and second intra-cavity fields resonating in the optical resonator;

determining a difference between the first resonating frequency and the second resonating frequency; and calculating the refractive index of the sample from the difference between the first and second frequency, wherein the second input field is a sideband of the first field and it is obtained by electro-optic phase modulation.

* * * * *